US012407079B2

(12) United States Patent
Hansen et al.

(10) Patent No.: US 12,407,079 B2
(45) Date of Patent: Sep. 2, 2025

(54) WAVEGUIDE DEVICE WITH SUPPORT MEANS

(71) Applicant: Robert Bosch GmbH, Stuttgart (DE)

(72) Inventors: Maik Hansen, Leonberg (DE); Armin Himmelstoss, Weissach Im Tal (DE)

(73) Assignee: ROBERT BOSCH GMBH, Stuttgart (DE)

( * ) Notice: Subject to any disclaimer, the term of this patent is extended or adjusted under 35 U.S.C. 154(b) by 220 days.

(21) Appl. No.: 18/165,690

(22) Filed: Feb. 7, 2023

(65) Prior Publication Data

US 2023/0253713 A1 Aug. 10, 2023

(30) Foreign Application Priority Data

Feb. 9, 2022 (DE) ..................... 10 2022 201 323.9

(51) Int. Cl.

*H01Q 1/00* (2006.01)
*H01Q 1/32* (2006.01)
*H01Q 21/06* (2006.01)
*H01Q 21/00* (2006.01)

(52) U.S. Cl.

CPC ........... *H01Q 1/005* (2013.01); *H01Q 1/3233* (2013.01); *H01Q 21/064* (2013.01); *H01Q 21/0087* (2013.01)

(58) Field of Classification Search

CPC .... H01Q 1/005; H01Q 1/2283; H01Q 1/3233; H01Q 1/325; H01Q 1/3275; H01Q 1/3283; H01Q 1/3291; H01Q 13/06; H01Q 21/0087; H01Q 21/06; H01Q 21/061; H01Q 21/064; H01Q 23/00; H05K 1/0271

See application file for complete search history.

(56) References Cited

U.S. PATENT DOCUMENTS

2022/0059918 A1* 2/2022 Hartner ................ H05K 1/0243
2022/0247089 A1* 8/2022 Hartner .................. H01Q 13/06

FOREIGN PATENT DOCUMENTS

DE 102014208389 A1 11/2015

* cited by examiner

*Primary Examiner* — Robert Karacsony
(74) *Attorney, Agent, or Firm* — NORTON ROSE FULBRIGHT US LLP

(57) ABSTRACT

A waveguide device. The waveguide device as a base element, having a first surface side and an oppositely situated second surface side, and a plurality of waveguide elements that conduct electromagnetic waves. The elements are arranged between the first and second surface sides and, on the first surface side, comprise a first waveguide opening arrangement and, on the second surface side, comprise a second waveguide opening arrangement different from the first waveguide opening arrangement. The base element comprises support elements for adapting a strain in a first plane comprising the first surface side to a strain in a second plane comprising the second surface side. The adaptation reduces a deformation of the waveguide device.

6 Claims, 4 Drawing Sheets

WAVEGUIDE DEVICE WITH SUPPORT MEANS

CROSS REFERENCE

The present application claims the benefit under 35 U.S.C. § 119 of German Patent No. DE 10 2022 201 323.9 filed on Feb. 9, 2022, which is expressly incorporated herein by reference in its entirety.

FIELD

The present invention relates to a waveguide device.

BACKGROUND INFORMATION

German Patent Application No. DE 10 2014 208 389 A1 describes an antenna device for a vehicle, said device comprising a generation means for generating electromagnetic waves and a waveguide system for transmitting electromagnetic waves. The waveguide system comprises a plurality of waveguide arrangements, each comprising an input for feeding in the electromagnetic waves generated and a plurality of outputs connected to the respective input for coupling out the electromagnetic waves fed into the respective input. The respective outputs are connected to openings on a surface side, from which the electromagnetic waves can radiate.

SUMMARY

According to the present invention, a waveguide device is provided. A deformation of the waveguide device can be reduced as a result.

According to an example embodiment of the present invention, the waveguide device can be configured as an antenna device, distribution device, or coupling device used for transmitting the electromagnetic waves between a first and a second connecting component.

The waveguide device can be arranged in a vehicle. The waveguide device can be associated with a sensor system of the vehicle.

The sensor system can be associated with a vehicle assistance system and/or a partially autonomous or autonomous driving system of the vehicle.

Between the first and second surface sides, the waveguide device can be designed in single-layered or multi-layered fashion. The first surface side can be associated with a first layer, and the second surface side can be associated with a second layer. Preferably, the first and second layers are respective outer layers of the waveguide device. Via the support elements, a total material volume of the first layer can approximate a total material volume of the second layer.

The strain on the first and/or second surface side can be a change in length triggered by material stresses that are free of external forces. The strain can be triggered by thermally induced mechanical stresses. The strain can be a strain related to material aging.

The first surface side and/or second surface side can be an outer face of the waveguide device. The first and/or second surface sides can be located opposite a further surface side of a further waveguide device. The first and/or second surface sides can comprise reflecting structures for altering a reflection of incident electromagnetic waves on the respective surface side.

A "waveguide opening arrangement" is understood to mean an arrangement of openings in the waveguide elements on the corresponding surface side. The individual waveguide element can form a waveguide for the electromagnetic waves.

In a preferred embodiment of the present invention, it is advantageous if the waveguide device is designed as a waveguide antenna, and the first waveguide opening arrangement is configured for emitting and/or receiving electromagnetic waves. The electromagnetic waves can have frequencies in the gigahertz range. The waveguide antenna can be designed as a radar antenna. The radar antenna can be associated with a vehicle radar.

In a particular embodiment of the present invention, it is advantageous if the second waveguide opening arrangement is connectable to a connecting component for transmitting the electromagnetic waves. The connecting component can be designed as a chip and/or a printed circuit board. The chip can be a high frequency chip.

In a particular embodiment of the present invention, it is advantageous if the first and second surface sides are arranged parallel to one another and opposite with respect to a first direction. A distance between the first and second surface sides can be less than a minimum extension of the first and/or second surface sides in a direction perpendicular to the first direction.

In a particular embodiment of the present invention, it is advantageous if the support elements comprise at least one compensation recess penetrating the second surface side and acting outside of a wave transmission of the electromagnetic waves, which recess is located opposite (with respect to the first direction) a waveguide element on the first surface side.

The compensation recess can have a depth that is less than a distance between the first and second surface sides.

The support element can also comprise at least one compensation recess penetrating the first surface side and acting outside of a wave transmission of the electromagnetic waves, which recess is located opposite (with respect to the first direction) a waveguide element on the second surface side.

In a particular example embodiment of the present invention, it is advantageous if the support elements comprise a plurality of such compensation recesses respectively situated (with respect to the first direction) opposite waveguide elements. Preferably, an associated compensation recess is situated opposite each of the waveguide elements, particularly if a waveguide element is not already arranged in that location.

In a preferred embodiment of the present invention, it is provided that at least two compensation recesses are combined to form a common compensation recess volume, which approximates a sum of the waveguide volumes as a total waveguide volume of waveguide elements situated respectively opposite in the first direction. The compensation recess volume can correspond to the total waveguide volume. The individual compensation recess volume can be dimensioned with the goal of matching the total waveguide volume by adapting the area of the compensation recess volume to the sum of the areas of the associated waveguide elements on the oppositely situated first surface side and the depth to the depth of the waveguide elements. The area of the compensation recess volume may also deviate from the sum of the areas of the associated waveguide elements, and the depth of the compensation recess volume may be dimensioned accordingly to differ from the depth of the waveguide elements on the first surface side in order to adapt the compensation recess volume to the total waveguide volume.

The compensation recess volume can also have a different basic geometry than the waveguide elements. For example, the compensation recess volume can be triangular, oval, or round, and the individual waveguide element can be rectangular, or vice versa. The compensation recess volume can also be a recess tapering or widening in the first direction, while the waveguide elements run parallel to the first direction.

In a particular embodiment of the present invention, it is advantageous if the support elements comprise at least one stiffening element, which is operatively arranged between the first and second surface sides and comprises material differing from that of the base element. The stiffening element can be made of material different from that of the base element, or be made of the same material. The stiffening element can be designed to be integral with the base element. The stiffening element can be connected to the base element in an form-locking, friction-locked, or integral manner. The stiffening element can be made of a plastic or metal. The stiffening element can be arranged between at least two waveguide elements. The stiffening element can increase the bending stiffness and compression stiffness of the waveguide device. The stiffening element can be designed as a strut.

A preferred embodiment of the present invention is advantageous, in which the stiffening element extends from the first surface side to the second surface side. A thickness of the stiffening element can correspond to a distance between the first and second surface sides. The stiffening element can be embedded within the base element.

In a particular embodiment of the present invention, it is advantageous if the base element is made of plastic, and the waveguide elements are designed as hollow metallic or dielectric waveguides. The plastic can be a thermosetting material or a thermoplastic. The base element can be produced by 3D printing.

Further advantages and advantageous embodiments of the present invention arise from the description wherein as well as the figures.

BRIEF DESCRIPTION OF THE DRAWINGS

The present invention is described in detail hereinafter with reference to the figures.

DETAILED DESCRIPTION OF EXAMPLE EMBODIMENTS

Figure 1B:
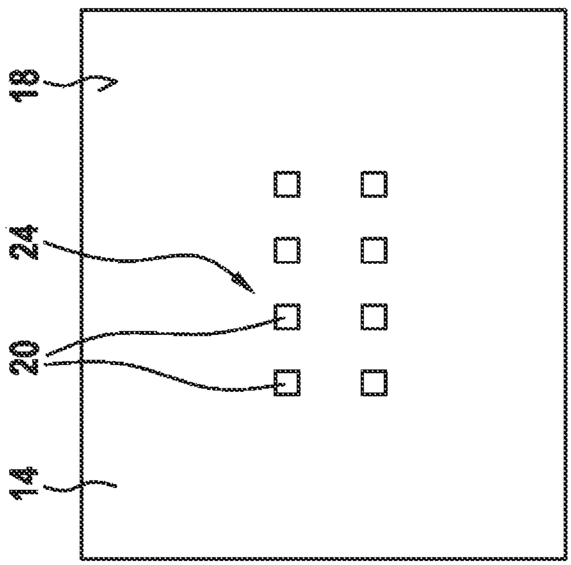
Fig. 1B related art
FIGS. 1A and 1B show a waveguide device in a previously available embodiment (related art).
Figure 1A:
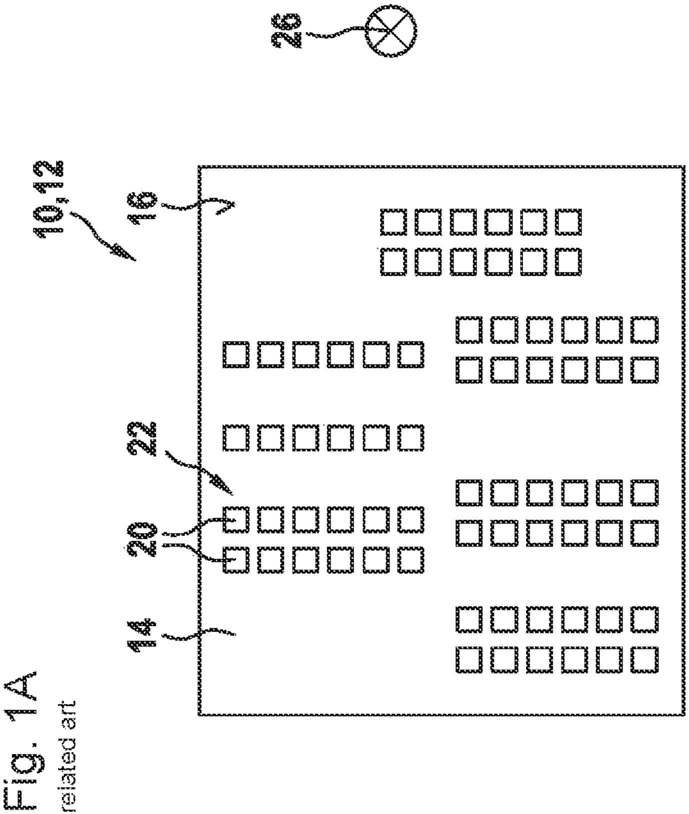
Fig. 1A related art

FIGS. 1A and 1B show a waveguide device in a previously available embodiment. The waveguide device 10 is designed as waveguide antenna 12 and comprises a base element 14, which has a first surface side 16 seen in FIG. 1A, which shows a front view of waveguide device 10, and an opposite second surface side 18 seen in FIG. 1B, which shows a rear view of waveguide device 10, and a plurality of waveguide elements 20 conducting electromagnetic waves, which waveguide elements are arranged between the first and second surface sides 16, 18 and comprise, on the first surface side 16, a first waveguide opening arrangement 22 and, on the second surface side 18, a second waveguide opening arrangement 24 different from the first waveguide opening arrangement 22.

The first waveguide opening arrangement 22 is configured for emitting and/or receiving electromagnetic waves. The second waveguide opening arrangement 24 is connectable to a connecting component for transmitting electromagnetic waves. The connecting component can be a chip and/or a printed circuit board.

The first and second surface sides 16, 18 are arranged parallel to one another and opposite with respect to a first direction 26 extending perpendicular to the plane of the page.

Figure 2:
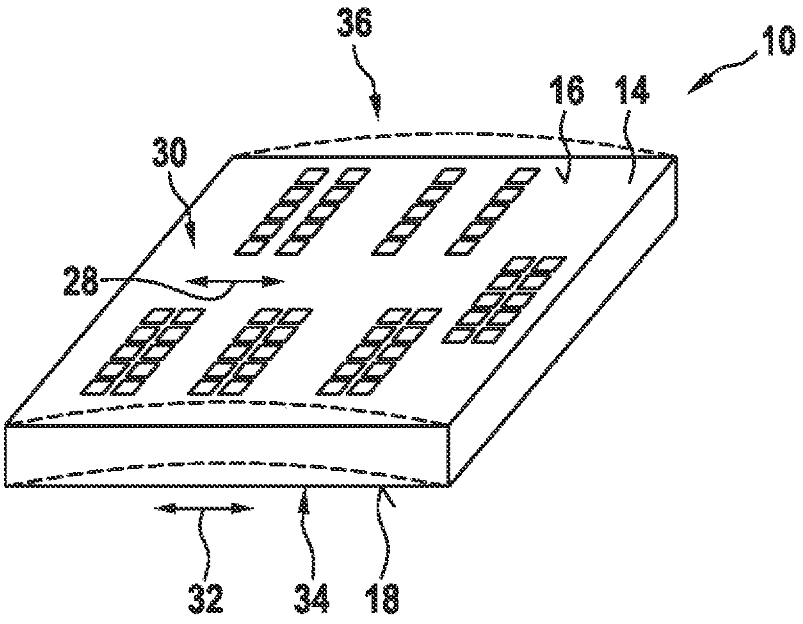
Fig. 2 related art
FIG. 2 shows a spatial view of a conventional waveguide device (related art).

FIG. 2 is a spatial view of a conventional waveguide device. The waveguide device 10 comprises the base element 14. The different first and second waveguide opening arrangements shown in FIG. 1 can cause different material stresses to occur on the first surface side 16 compared to the second surface side 18, which results in a strain 2 in a first plane 30 comprising the first surface side 16, which deviates from a strain 32 in a second plane 34 comprising the second surface side 18. The differing strains 28, 32 results in a deformation 36 of the waveguide device 10 and can degrade its reliability, stability, and function.

Figure 3:
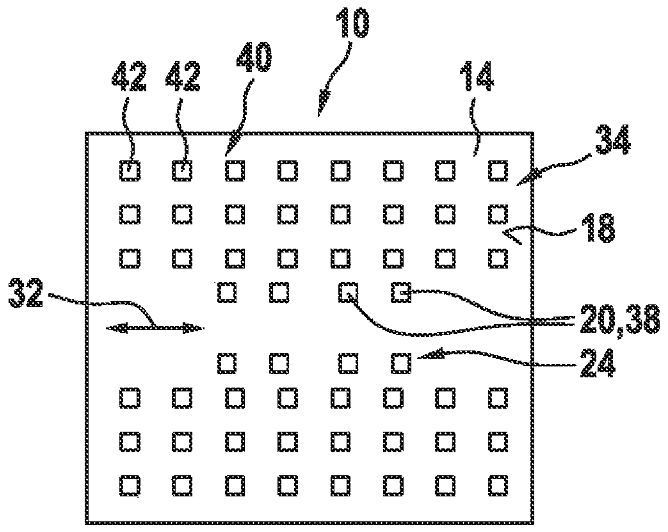
FIG. 3 shows a waveguide device in a particular example embodiment of the present invention.

FIG. 3 shows a waveguide device in a specific embodiment of the present invention. The waveguide device 10 comprises the base element 14 having the waveguide elements 20, which comprise the second waveguide opening arrangement 24 on the second surface side 18, via which, e.g., a connection to a connecting component can be effected for transmitting electromagnetic waves.

Preferably, the base element 14 is made of a plastic, and the waveguide elements 20 are designed as hollow metallic or dielectric waveguides 38. The base element 14 comprises support means (i.e., elements) 40 for adapting a strain in the first plane comprising the first surface side to a strain 32 in the second plane 34 comprising the second surface side 18. The support means 40 comprise a plurality of compensation recesses 42 penetrating the second surface side 18 and acting outside of a wave transmission of the electromagnetic waves. In this case, an associated compensation recess 42 on the second surface side 18 lies opposite of each of the waveguide elements 20 of the first waveguide opening arrangement, particularly if a waveguide element 20 is not already arranged in that location. The first waveguide opening arrangement is thus mirrored on the second surface side 18 in the form of compensation recesses 42, whereby the structures of the first and second surface sides are adapted to one another, as a result of which, e.g., the thermal strain in the first plane is adapted to the strain 32 in the second plane 34. The deformation of the waveguide device 10 is thereby reduced.

Figure 4:
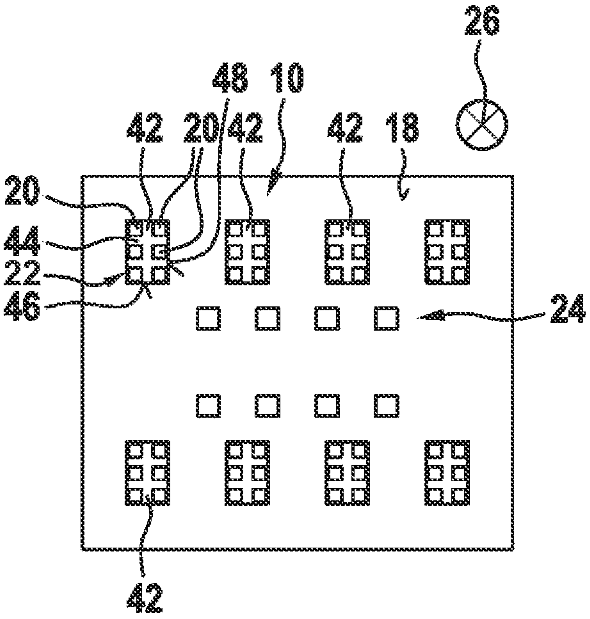
FIG. 4 shows a waveguide device in a further particular example embodiment of the present invention.

FIG. 4 shows a waveguide device in a further particular embodiment of the present invention. The waveguide device 10 comprises the second waveguide opening arrangement 24 and the compensation recesses 42 on the second surface side 18. The compensation recesses 42 are designed as a common compensation recess volume 44, which is approximated to, preferably adapted to, a sum of the waveguide volumes as a total waveguide volume of waveguide elements 20, situated opposite in the first direction 26, of the first waveguide opening arrangement 22, which is shown here in dashed lines. The common compensation recess volumes 44 can be produced more simply and more accurately than smaller, individual compensation recesses 42.

The individual compensation recess volume 44 can be dimensioned with the goal of matching the total waveguide volume by adapting the surface 46 of the compensation recess volume 44 to the sum of the surfaces 48 of the associated waveguide elements 20 on the opposite first surface side and the depth to the depth of the waveguide elements 20. The surface 46 of the compensation recess volume 44 may also deviate from the sum of the surfaces 48 of the associated waveguide elements 20, and the depth of the compensation recess volume 44 may accordingly be dimensioned differently from the depth of the waveguide elements 20 on the first surface side in order to adapt the compensation recess volume 44 with the total waveguide volume.

Figure 5:
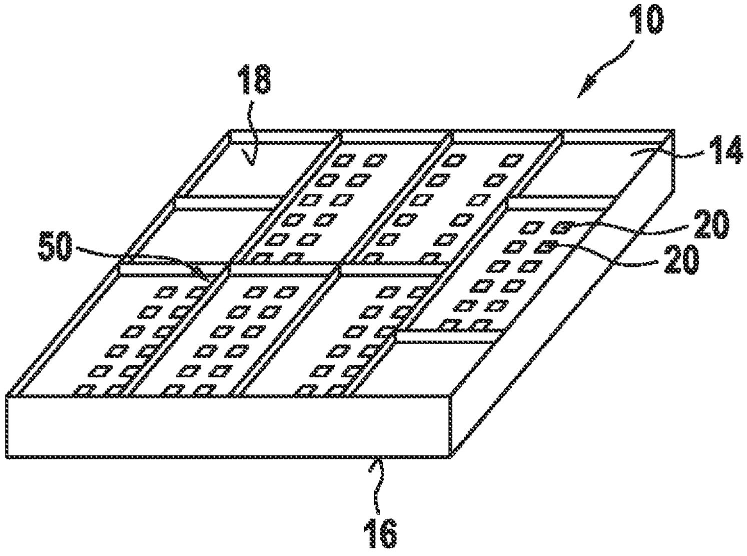
FIG. 5 shows a spatial view of a waveguide device in a further particular example embodiment of the present invention.
Figure 6:
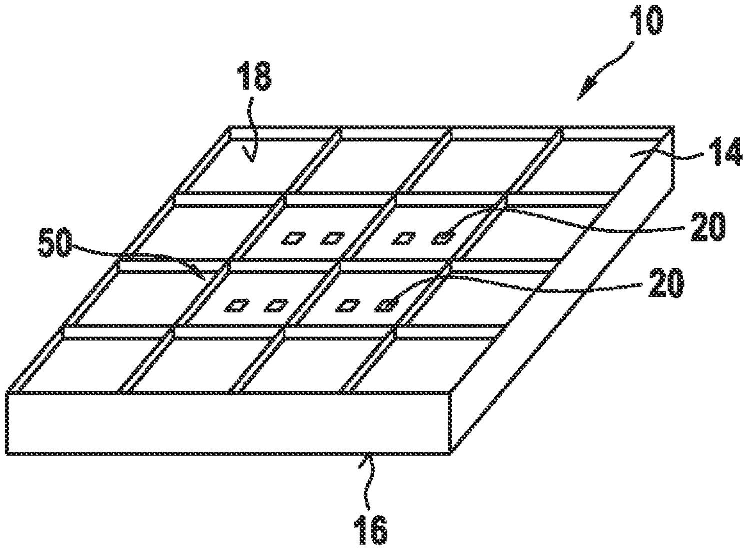
FIG. 6 shows a spatial view of a waveguide device in a further particular example embodiment of the present invention.

FIG. 5 is a spatial view of a waveguide device in a further particular embodiment of the present invention. The waveguide device 10 in FIGS. 5 and 6 in each case comprises the base element 14 having the waveguide elements 20. The second surface side 18 is depicted in a transparent manner in this case. The support means 40 comprise a plurality of stiffening elements 50, which are operatively arranged between the first and second surface sides 16, 18 and are comprised of material differing from that of the base element 14. The stiffening elements 50 may be made of a material different from that of the base element 14, or may be made of the same material, e.g., plastic or metal, preferably integral with the base element 14. The stiffening elements 50 are arranged between the waveguide elements 20 and increase the bending stiffness and compression stiffness of the waveguide device 10.

What is claimed is:

1. A waveguide device, comprising:

a base element having a first surface side and an oppositely situated second surface side; and a plurality of waveguide elements that conduct electromagnetic waves, the elements being arranged between the first surface side and the second surface side, the first surface side having a first waveguide opening arrangement and, the second surface side having a second waveguide opening arrangement different from the first waveguide opening arrangement;

wherein the base element includes support elements configured to adapt a strain in a first plane including the first surface side to a strain in a second plane including the second surface side, the adaptation reducing a deformation of the waveguide device, wherein the first and second surface sides are arranged parallel to each other and opposite with respect to a first direction, and wherein the support elements include at least one compensation recess penetrating the second surface side and acting outside of a wave transmission of the electromagnetic waves, the recess being located, with respect to the first direction, opposite a waveguide element on the first surface side.

2. The waveguide device according to claim 1, wherein the waveguide device is a waveguide antenna, and the first waveguide opening arrangement is configured for emitting and/or receiving electromagnetic waves.

3. The waveguide device according to claim 2, wherein the second waveguide opening arrangement is connectable to a connecting component for transmitting electromagnetic waves.

4. The waveguide device according to claim 1, wherein the support elements include a plurality of compensation recesses situated respectively opposite waveguide elements with respect to the first direction.

5. The waveguide device according to claim 4, wherein at least two of the compensation recesses are combined into a common compensation recess volume, which approximates a sum of waveguide volumes as a total waveguide volume of waveguide elements situated respectively opposite in the first direction.

6. The waveguide device according to claim 1, wherein the base element is made of plastic, and the waveguide elements are hollow metallic or dielectric waveguides.

* * * * *